United States Patent
Lin (10) Patent No.: US 8,250,708 B2
(45) Date of Patent: Aug. 28, 2012

(54) HINGE

(75) Inventor: Chao-Chi Lin, Taichung (TW)

(73) Assignee: Leohab Enterprise Co., Ltd., Taichung (TW)

( * ) Notice: Subject to any disclaimer, the term of this patent is extended or adjusted under 35 U.S.C. 154(b) by 44 days.

(21) Appl. No.: 12/946,903

(22) Filed: Nov. 16, 2010

(65) Prior Publication Data

US 2012/0060324 A1 Mar. 15, 2012

(30) Foreign Application Priority Data

Sep. 10, 2010 (TW) .............................. 99217650 U (51) Int. Cl.
*E05F 1/08* (2006.01)

(52) U.S. Cl. ................ 16/303; 16/340; 16/382; 16/367; 16/239

(58) Field of Classification Search ............ 16/297, 16/299, 335, 337, 339, 355, 357, 360, 374, 16/286, 303, 330, 239; 361/679.08, 679.11, 361/679.02, 679.15, 679.27; 455/90.3, 575.1, 455/575.3, 575.8, 550.1, 56; 379/433.12, 379/433.13; 348/373, 333.01, 333.06, 794; 248/919–923, 291.1, 292.12, 292.13

See application file for complete search history.

(56) References Cited

U.S. PATENT DOCUMENTS

| | | | | |
|---|---|---|---|---|
| 4,589,659 A * | 5/1986 | Yokoi et al. | ...................... | 463/34 |
| 4,730,364 A * | 3/1988 | Tat-Kee | .................... | 361/679.09 |
| 5,894,633 A * | 4/1999 | Kaneko | ........................... | 16/306 |
| 5,975,195 A * | 11/1999 | Lowry et al. | ..................... | 165/86 |
| 6,481,057 B2 * | 11/2002 | Lin | ................................ | 16/340 |
| 6,666,422 B1 * | 12/2003 | Lu et al. | ..................... | 248/291.1 |
| 7,219,393 B2 * | 5/2007 | Kida | ................................ | 16/221 |
| 2004/0074050 A1 * | 4/2004 | Birtley | ........................... | 16/340 |
| 2004/0244148 A1 * | 12/2004 | Cho et al. | ........................ | 16/340 |
| 2007/0050942 A1 * | 3/2007 | Hu | .................................. | 16/340 |
| 2007/0283533 A1 * | 12/2007 | Wang | ................................ | 16/337 |
| 2010/0041448 A1 * | 2/2010 | Gaddy et al. | ................ | 455/575.3 |
| 2011/0292605 A1 * | 12/2011 | Chen et al. | .................... | 361/695 |

FOREIGN PATENT DOCUMENTS

CN 201075189 Y 6/2008

* cited by examiner

*Primary Examiner* — Chuck Y. Mah (74) *Attorney, Agent, or Firm* — Alan Kamrath; Kamrath IP Lawfirm, PA (57) ABSTRACT

A hinge includes a fixing frame, a rotating frame, a support, and a connecting member. The rotating frame is pivotally joined to the fixing frame. The support includes a first connecting portion for joining to the base and a second connecting portion. The connecting member is mounted between the rotating frame and the support. Furthermore, the connecting member is operably moved between an extended position and a retracted position in response to two opposite pivoting directions of the rotating frame with respect to the fixing frame. In addition, the support moves away from the rotating frame in response to the connection member moving from the retracted position to the extended position thereof.

16 Claims, 9 Drawing Sheets

HINGE

BACKGROUND OF THE INVENTION

1. Field of the Invention

The present invention relates to a hinge that is usable in an electronic device and, particularly, to a hinge including a connecting member that occupies a substantially small internal space of the hinge and is adapted to be operably moved in response to the operation of the hinge to elevate the electronic device from a surface the electronic device is placed on to make the electronic device experience a heat-dissipating effect.

2. Description of the Related Art

Electronic devices that are made portable, for example, laptops, generally suffer a problem that internal processors and components thereof crash easily, since they are fitted in a compact size and since their temperatures raise relatively high quickly after a long use period. Therefore, heat dissipation for these components is always an issue to be dealt with.

A cooling pad is what is now commonly seen in the market as a solution to the heat problem. In use of the cooling pad, an electronic device is placed atop of the cooling pad so the electronic device is adapted to be spaced from a surface by the cooling pad to facilitate heat dissipation. However, an additional effort is needed to bring the cooling pad.

In order to obviate this trouble, China Pat. No. 201075189Y shows a laptop with a leg that is foldable and is fitted under the bottom of a base of the laptop. When the leg is in an open position, the leg is adapted to elevate the base in the air to enable the laptop to experience a heat-dissipating effect. On the contrary, the leg is in a closed position when not in use. Unfortunately, a new mold for the base is needed for making the base adapted to allow the leg to be mounted thereon. Therefore, it entails a substantially high manufacture cost. Also, a longer leg is needed if the base is to be elevated higher. However, a larger space is therefore needed to be provided for the reception of the larger leg. Furthermore, the leg is not adapted to be adjustably fixed at various elevated angles to meet the user's demand, and in addition, the user would experience an abrupt pause or jump during the operation thereof.

The present invention is, therefore, intended to obviate or at least alleviate the problems encountered in the prior art.

SUMMARY OF THE INVENTION

According to the present invention, a hinge is useable in an electronic device which includes a base and a cover, with the cover pivotal with respect to the base through the hinge. The hinge includes a fixing frame, a rotating frame, a support, and a connecting member. The rotating frame is pivotally joined to the fixing frame and includes a joint rotated concurrently with the rotating frame relative to the fixing frame. The support includes a first connecting portion for joining to the base and a second connecting portion. The connecting member is mounted between the rotating frame and the support and includes a first distal end joined to the joint, and a second distal end joined to the second connecting portion. Furthermore, the connecting member is operably moved between an extended position and a retracted position in response to two opposite pivoting directions of the rotating frame with respect to the fixing frame, and in addition, the support moves away from the rotating frame in response to the connection member moving from the retracted position to the extended position thereof. In this regard, the electronic device that employs the hinge is adapted to be gradually elevated from the support by the connecting member as the rotating frame is pivoted away from the fixing frame, and the base and a surface that bears the electronic device by supporting the support includes a gradually increased gap therebetween as the cover is pivoted away from the base, which enables air to flow under the base through the gap in order to make the electronic device experience a heat-dissipating effect.

It is an object of the present invention to provide a hinge that is usable in an electronic device and can make the electronic device experience a heat-dissipating effect.

It is another object of the present invention to provide a hinge that eliminates the need for remolding the electronic device for the installation of the hinge.

It is a further object of the present invention to provide a hinge that has a simple structure and the making thereof is cost-saving.

Other objects, advantages, and new features of the present invention will become apparent from the following detailed description of the invention when considered in conjunction with the accompanied drawings.

DETAILED DESCRIPTION OF THE PREFERRED EMBODIMENTS

A hinge 1 in accordance with the present invention includes a fixing frame 10, a rotating frame 20, a support 30, a connecting member 40, and a torque assembly 50. The hinge 1 is usable in an electronic device 90 which has a base 91 and a cover 92.

The fixing frame 10 includes a fixing end 11, and an axle 12 extending from and non-movably positioned with respect to the fixing end 11. In the electronic device employing the hinge 1, the fixing frame 10 is preferably mounted on the base 91 with the fixing end 11 attaching with the base 91.

Figure 1:
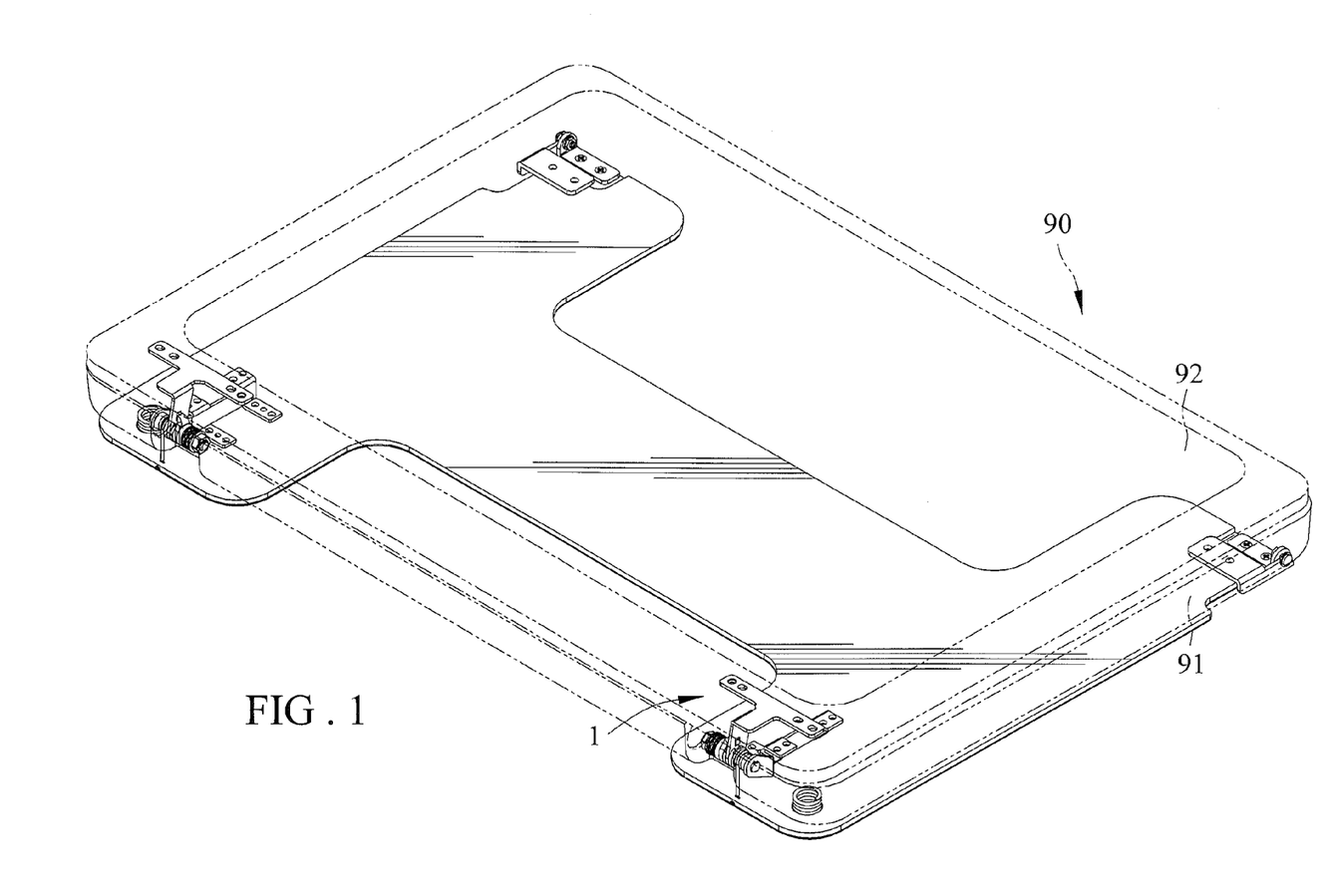
FIG. 1 is a perspective view of an electronic device including a base, a cover, and a hinge in accordance with the present invention interconnecting the base and the cover, with the electronic device shown in phantom.
Figure 2:
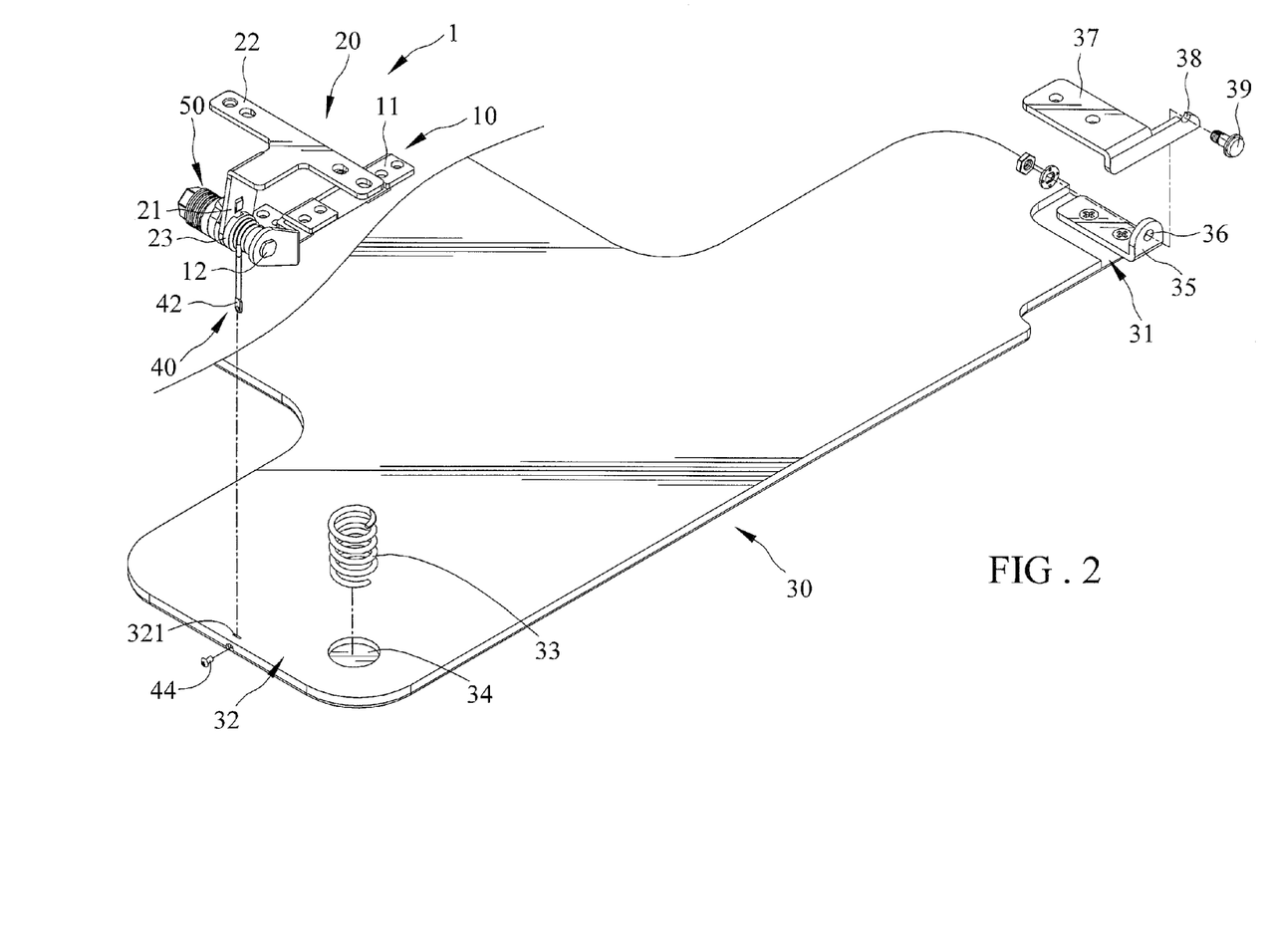
FIG. 2 is an exploded perspective view of the hinge shown in FIG. 1.
Figure 3:
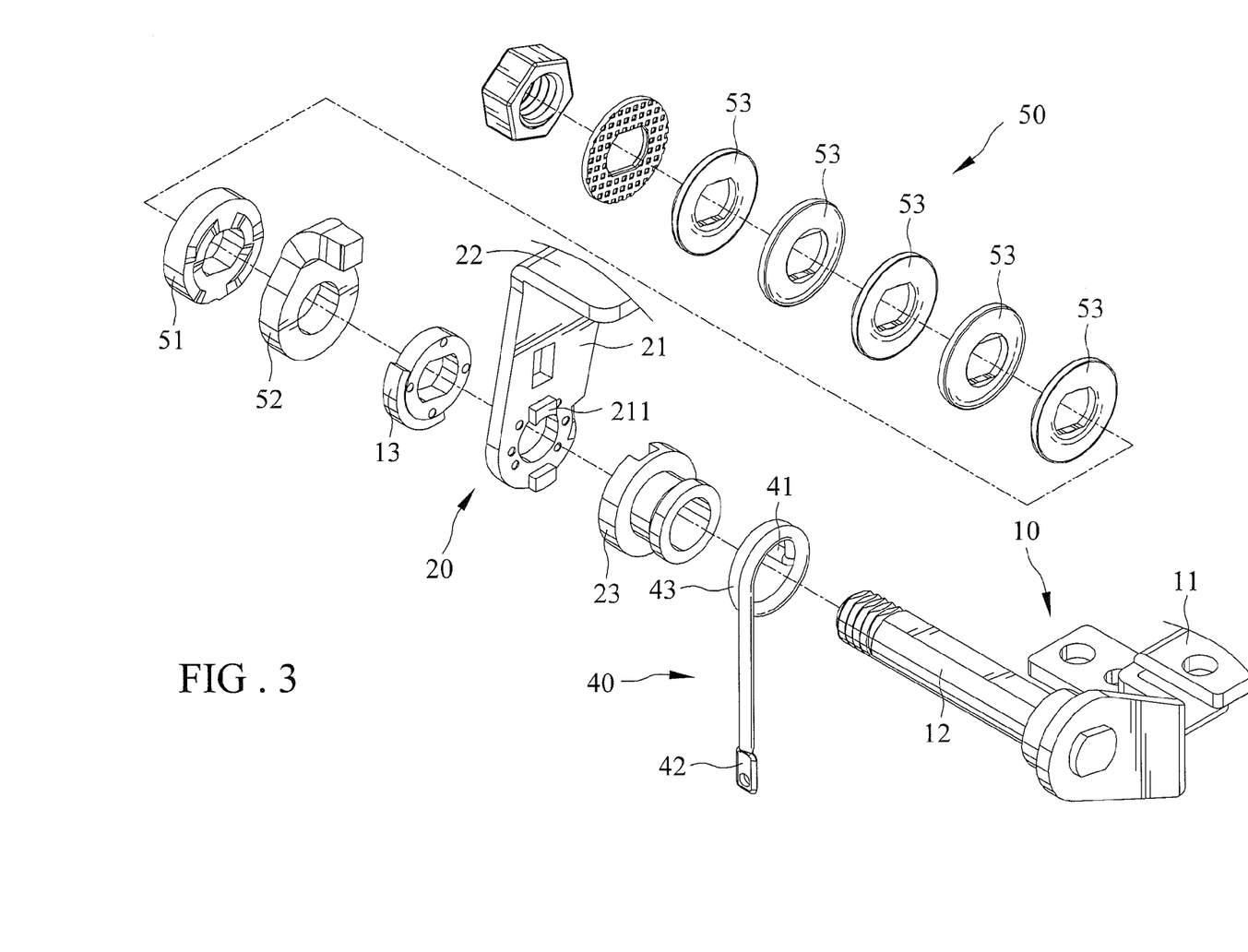
FIG. 3 is a partial, exploded, perspective view of the hinge shown in FIG. 1.
Figure 4:
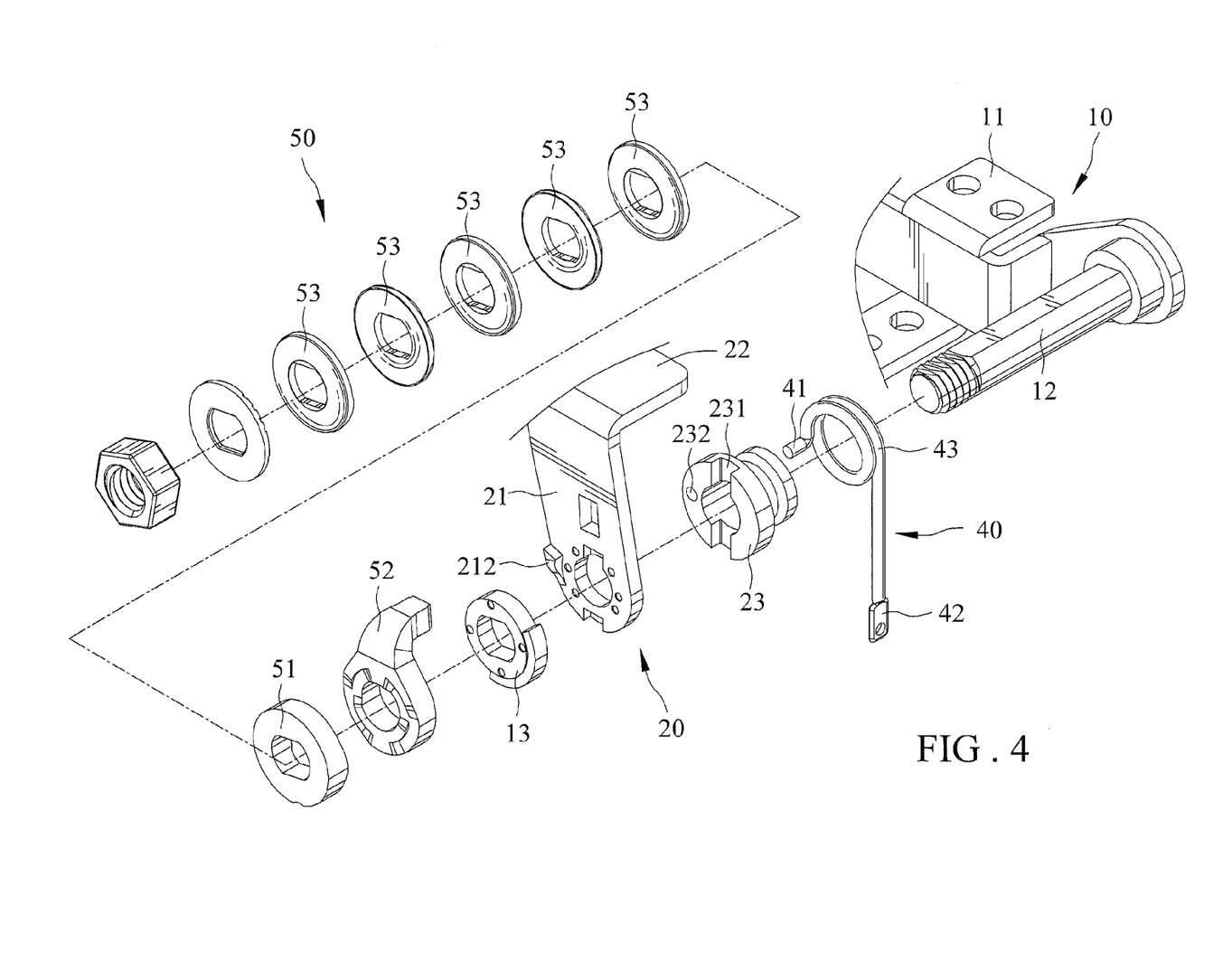
FIG. 4 is another partial, exploded, perspective view of the hinge shown in FIG. 1 taken from a different angle than that of FIG. 4.
Figure 5:
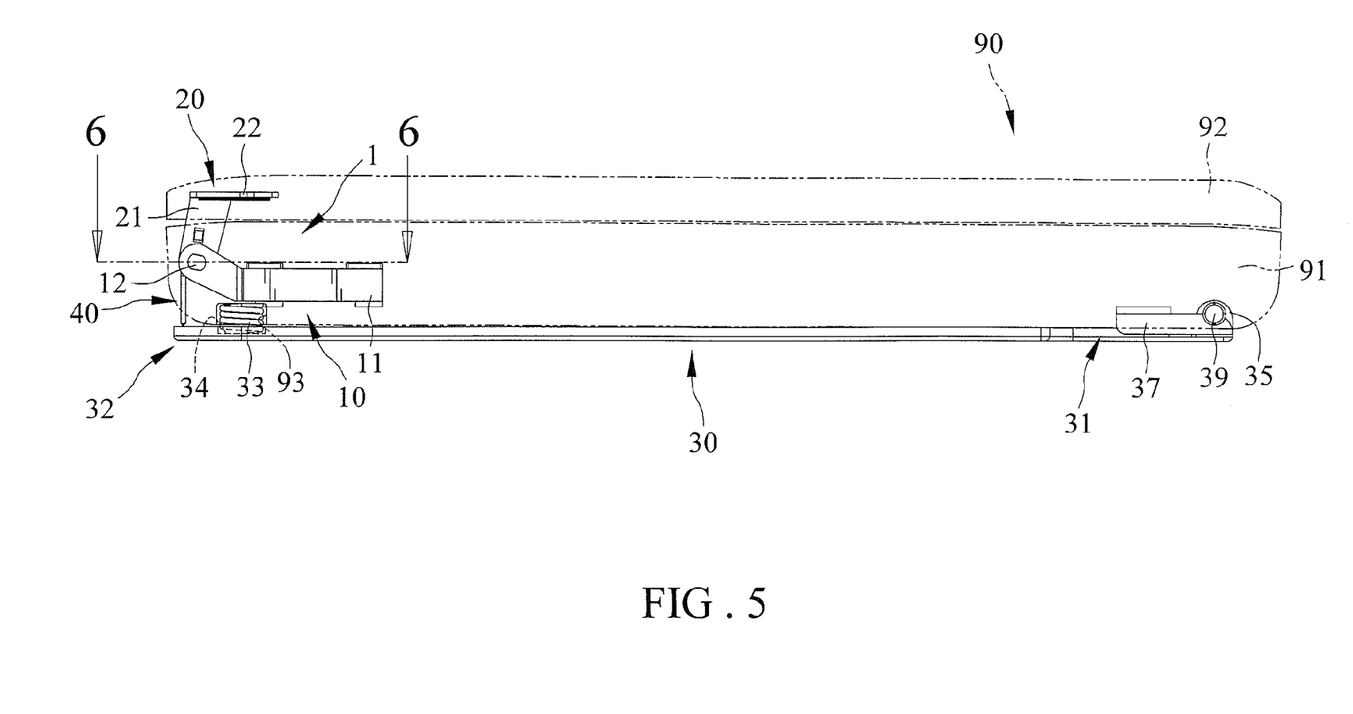
FIG. 5 is a cross-sectional view of FIG. 1.
Figure 6:
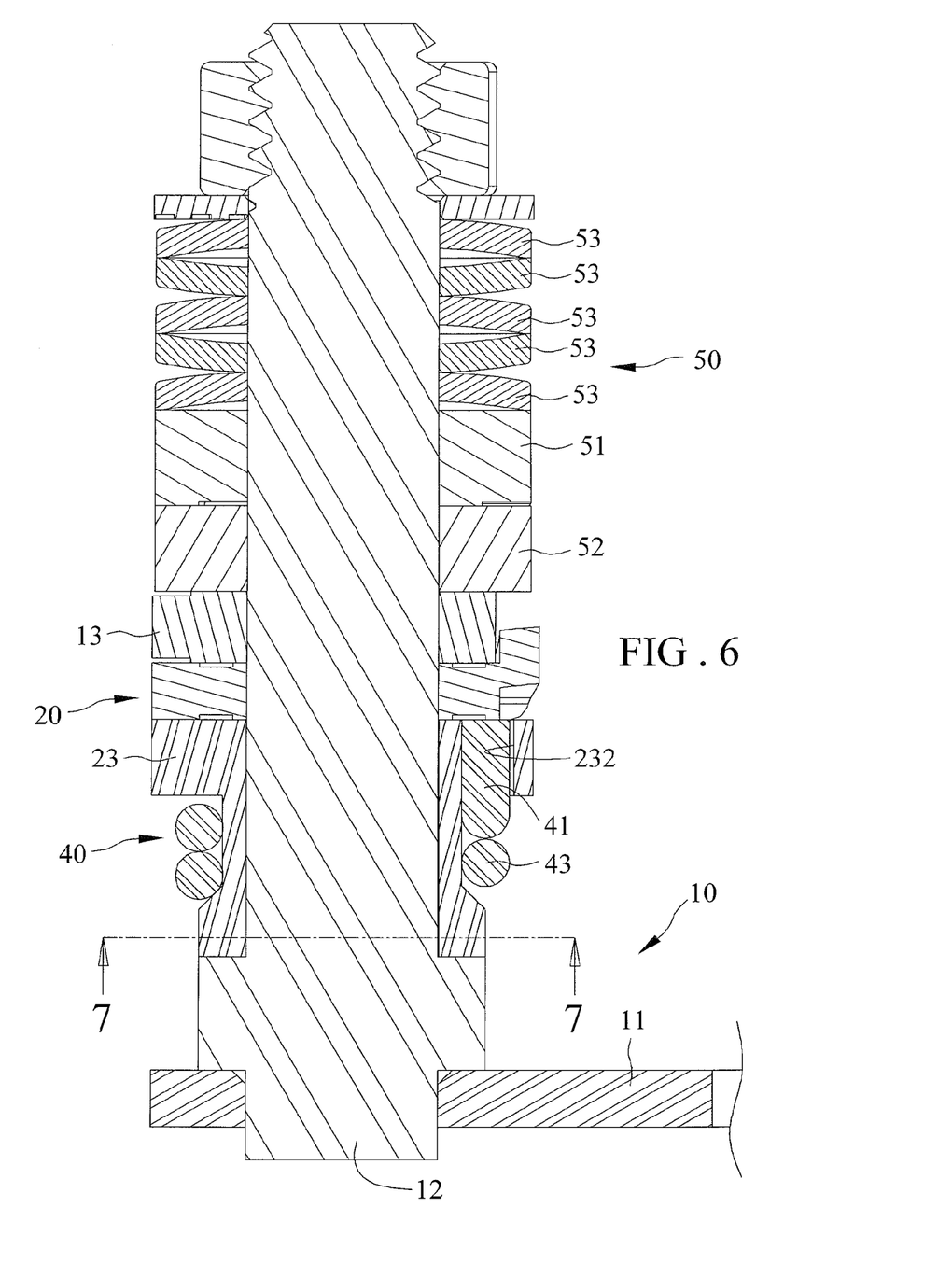
FIG. 6 is a cross-sectional view taken along line 6-6 of FIG. 5.
Figure 7:
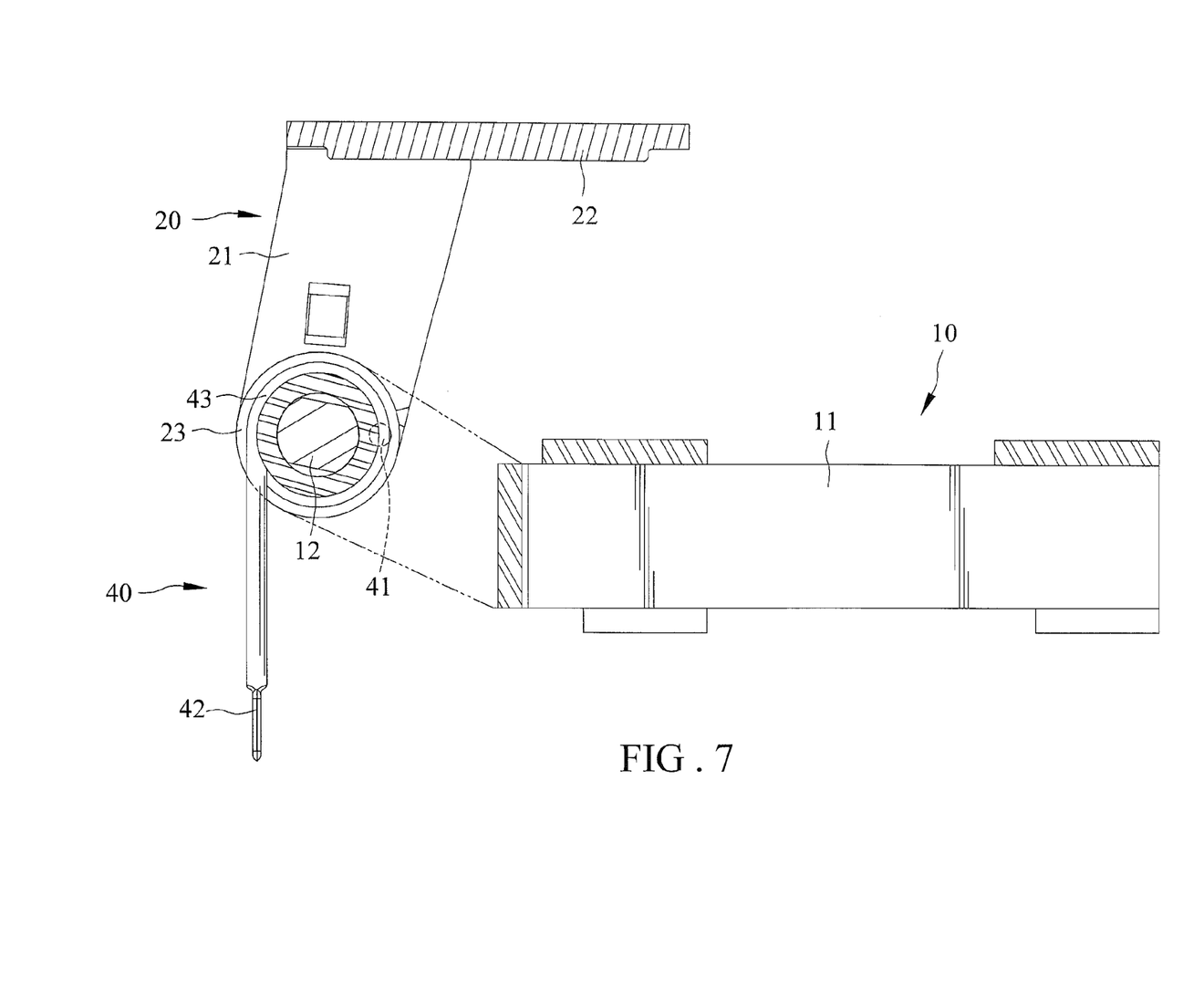
FIG. 7 is a cross-sectional view taken along line 7-7 of FIG. 6.
Figure 8:
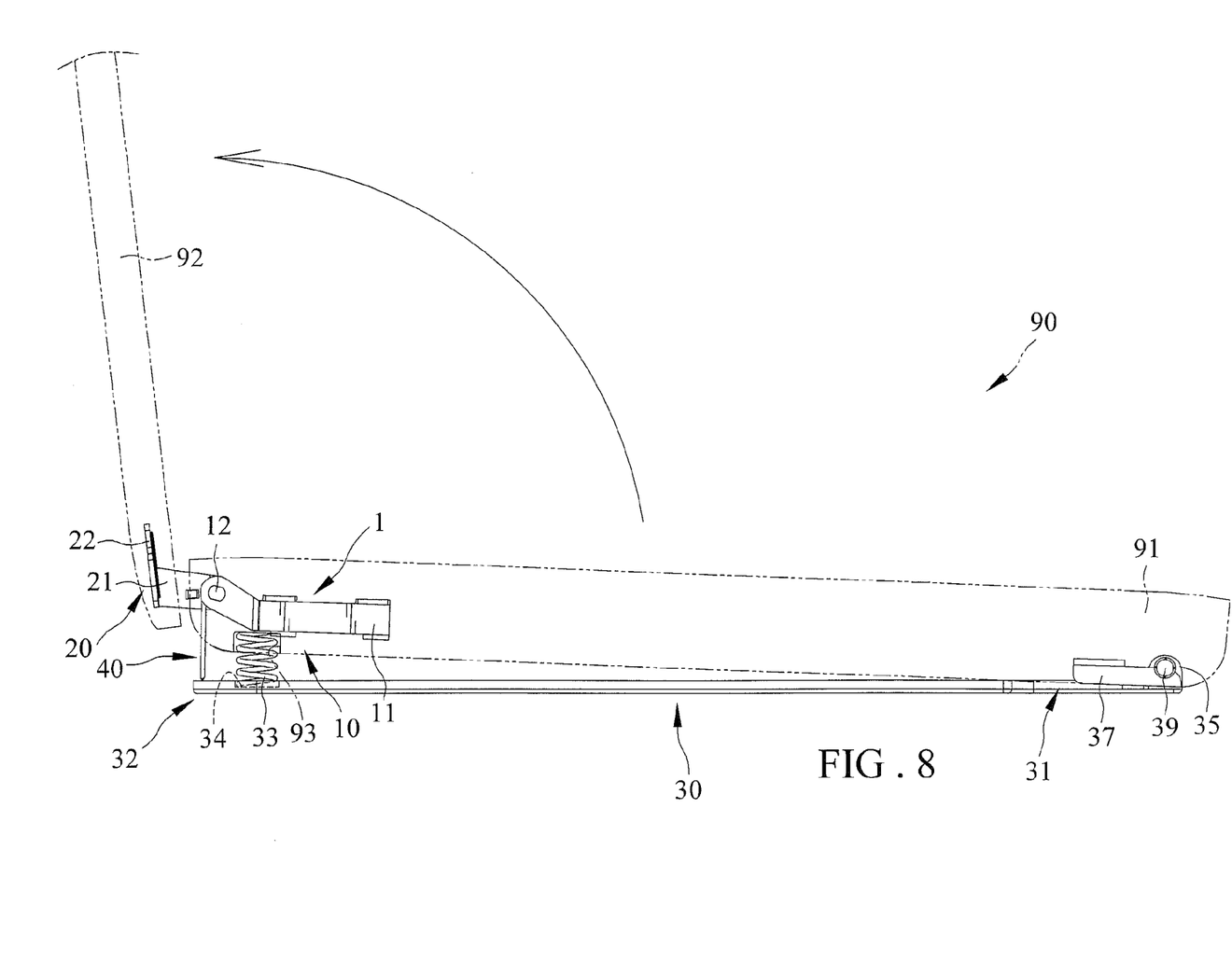
FIG. 8 is an extended cross-sectional view of FIG. 5 and shows the cover pivoted away from the base and the base in an elevated position to make the electronic device experience a heat-dissipating effect.
Figure 9:
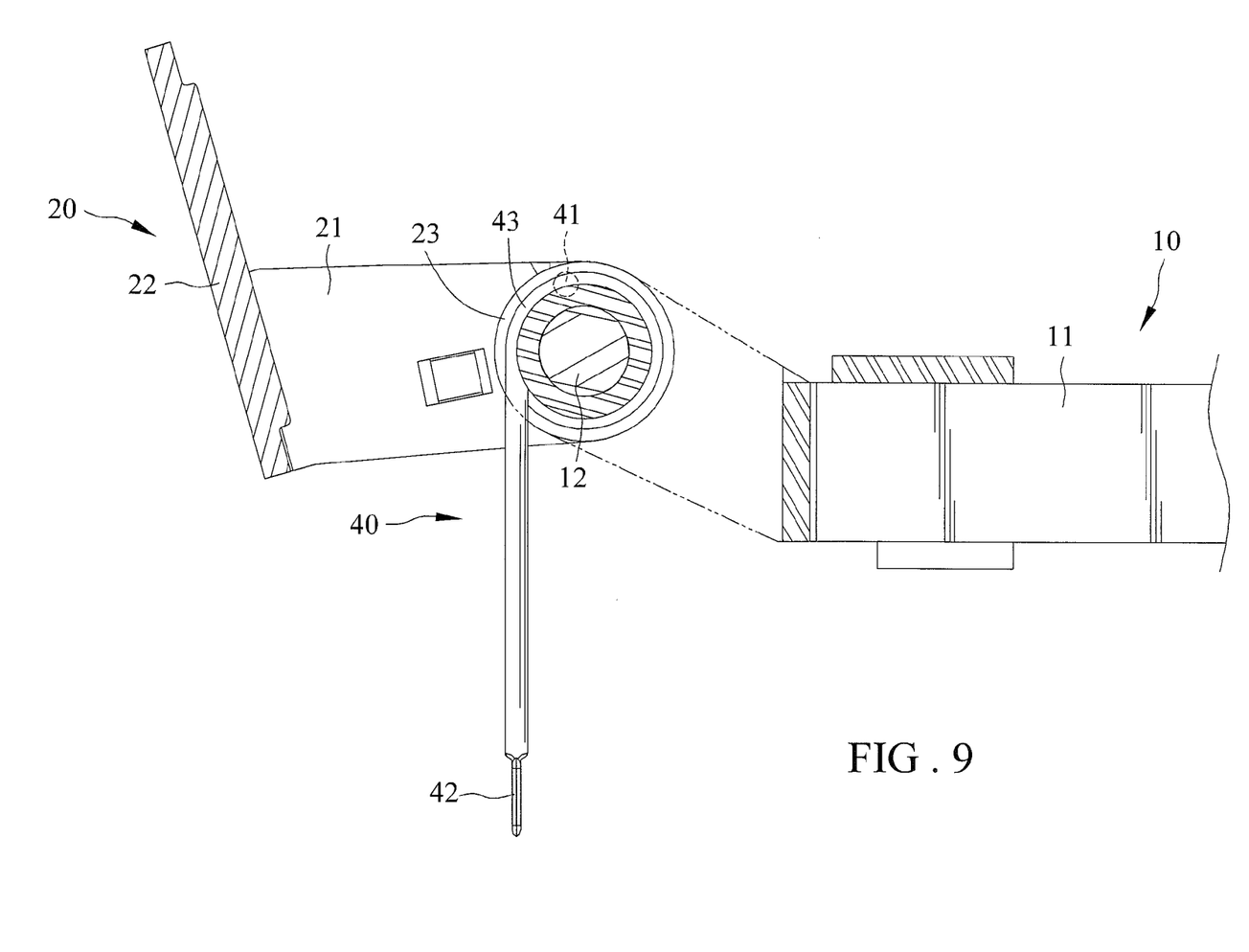
FIG. 9 is an extended cross-sectional view of FIG. 7 and shows the hinge in the position shown in FIG. 8.

The rotating frame 20 includes an engaging end 21 and is joined to the fixing frame 10 with the engaging end 21 joined to the axle 12 of the fixing frame 10. Furthermore, the rotating frame 20 is rotatable with respect to the fixing frame 10 in a manner that it is pivotal with respect to the fixing frame 10 about the axle 12. The rotating frame 20 also includes a joining end 22 defined at an end of the engaging end 21. In the electronic device employing the hinge 1, the rotating frame 20 is preferably mounted on the cover 92 with the joining end 22 attaching with the cover 92. Further, a joint 23 is mounted on the rotating frame 20 and is rotatable with the rotating frame 20 relative to the fixing frame 10. That is, the joint 23 includes an edge engaging with a side of the engaging end 21 of the rotating frame 20, the side of the engaging end 21 includes a limiting edge 211 extending therefrom while the edge of the joint 23 includes a limiting edge 231 extending therefrom, to engage with the limiting edge 211 to make the joint 23 and the rotating frame 20 pivotal concurrently with respect to the fixing frame 10. Preferably, the joint 23 is inserted through by the axle 12. As shown in FIGS. 3 and 4, the limiting edge 211 is a protuberance while the limiting edge 231 is a recess. As also shown in FIGS. 3 and 4, the rotating frame 20 and the joint 23 are formed separately. Notwithstanding, the rotating frame 20 and the joint 23 may be formed integrally as a one piece element. Additionally, the fixing frame 10 and the rotating frame 20 may include a stop 13 mounted therebetween to limit a pivot angle that the rotating frame 20 is adapted to rotate with respect to the fixing frame 10. That is, the stop 13 is non-rotatably positioned with respect to the fixing frame 10 and includes a circumferential edge defining two terminal ends separated from each other in a circumferential distance, which determines a range of the pivot angle of the rotating frame 20, to selectively abut against a projection 212 extended from the engaging end 21 of the rotating frame 20. Preferably, the stop 13 is inserted through by the axle 12 of the fixing frame 10.

The support 30 is disposed under the base 91 of the electronic device 90. Furthermore, the support 30 includes a first end and a second end and extends from the first end to the second end, and the first end includes a first connecting portion 31 defined thereon for pivotally joining to the base 91. That is, the first connecting portion 31 includes a first joining member 35 fixed thereto. A second joining member 37 is pivotally mounted on the first joining member 35 for joining to the base 91. A pivot 39 is inserted through a slot 38 defined in the second joining member 37 and an aperture 36 defined in the first joining member 35 to pivotally connect the first joining member 35 with the second joining member 37. In addition, the second end includes a second connecting portion 32 joined to the connecting member 40. Also, the connecting member 40 is joined to the joint 23. Accordingly, the connecting member 40 is mounted between the rotating frame 20 and the support 30. Preferably, the connecting member 40 includes a first distal end 41 engaged in an aperture 232 defined in the joint 23 and a second distal end 42 concealed in a receptacle 321 defined in the support 30 and restrained therein. In this regard, a fastener 44 may be used to prevent the second distal end 42 from detachment from the support 30. As shown in FIGS. 3 and 4, the connecting member 40 also includes a middle section 43 looped around the joint 23. Additionally, the connecting member 40 is gradually extended from the joint 23 to move the support 30 from the rotating frame 20 and to separate the base 91 and the support 30. That is, the base 91 is pivotally separated from the support 30, and a gap is formed and increases between the base 91 and the second connecting portion 32 of the support 30 as the rotating frame 20 is pivoted away from fixing frame 10. On the contrary, the connecting member 40 is gradually retracted onto the joint 23, and the gap between the base and the support is gradually reduced as the rotating frame 20 is pivoted towards the fixing frame 10. Preferably, the connecting member 40 is a metal wire which is of a flexible structure adapted to be circumferentially surrounded on the joint 23. Further, a resilient member 33 is mounted between the base 91 and the support 30 and includes one of two opposite distal ends abutted against the base 91, with the other distal end abutted against the support 30 to facilitate the elevation of the electronic device 90. In this connection, the resilient member 33 is in a depressed state when the support 30 is adjacent to the base 91 and is in a released state which has a longer longitudinal length between the two opposite distal ends than in the depressed state to provide a resilient force to urge the base 91 away from the support 30 in response to the pivoting of the rotating frame 20 away from the fixing frame 10. Additionally, in order to prevent the resilient member 33 from dislocation, the distal end that abuts against the support 30 is restrained in a cavity 34 defined in the support 30, and the distal end that abuts against the base 91 is restrained in a cavity 93 defined in the base 91.

The torque assembly 50 includes a first cam 51 non-rotatably positioned with respect to the fixing frame 10. Preferably, the first cam 51 is inserted through by the axle 12 of the fixing frame 10. The torque assembly 50 further includes a second cam 52 engaging with the first cam 51. The second cam 52 is rotatable with the rotating frame 20 relative to the fixing frame 10. That is, the second cam 52 includes a hooking end joined to the engaging end 21 of the rotating frame 20 in a manner that it rotates concurrently with the rotating frame 20. Preferably, the second cam 52 is inserted through by the axle 12. In response to pivoting of the rotating frame 20 away from the fixing frame 10, the first and second cams 51 and 52 interact with each other to generate torque that is different for specific relative positions of the rotating frame 20 with respect to the fixing frame 10. The torque assembly 50 further includes at least one urging member 53 resiliently urging the first cam 51 to retain the first and second cams 51 and 52 engaged together. Preferably, the at least one urging member 53 is inserted through by the axle 12 of the fixing frame 10.

In view of the forgoing, the electronic device 90, which employs the hinge 1, is adapted to be gradually elevated from the support 30 by the connecting member 40 of the hinge 1 as the cover 92 of the electronic device 90 is operably pivoted away from the base 91, which results in the rotating frame 20 being pivoted away from fixing frame 10. So, the base 91 of the electronic device 90 and a surface that bears the electronic device 90 by supporting the base 91 and the support 30 will include a gradually increased gap therebetween as the cover 92 is pivoted away from the base 91, which enables air to flow under the base 91 through the gap in order to make the electronic device 90 experience a heat-dissipating effect. Additionally, the connecting member 40 is adapted to be retracted onto the joint 23, thereby eliminating the need for remolding the base 91 with an additional receiving area for the connecting member 40. In addition, since the connecting member 40 is movable between an extended position and a retracted position in response to two opposite pivoting directions of the rotating frame 20 with respect to the fixing frame 10 and the movement thereof is continuous and smooth, the user will not experience an abrupt pause or jump during the operational movement thereof. Furthermore, the resilient member 33 facilitates pivoting of the rotating frame 20 away from the fixing frame 10.

While the specific embodiment has been illustrated and described, numerous modifications come to mind without significantly departing from the spirit of invention, and the scope of invention is only limited by the scope of the accompanying claims.

What is claimed is:

1. A hinge useable in an electronic device which includes a base and a cover, with the cover pivotal with respect to the base through the hinge, comprising:

a fixing frame;

a rotating frame pivotally joined to the fixing frame;

a joint rotated concurrently with the rotating frame relative to the fixing frame;

a support including a first connecting portion for joining to the base and a second connecting portion; and a connecting member mounted between the rotating frame and the support and including a first distal end joined to the joint, and a second distal end joined to the second connecting portion, and the connecting member operably moved between a first position and a second position in response to two opposite pivoting directions of the rotating frame with respect to the fixing frame, with the support moving away from the rotating frame in response to the connection member moving from the second position to the first position thereof; and wherein the electronic device that employs the hinge is adapted to be gradually elevated from the support by the connecting member as the rotating frame is pivoted away from the fixing frame, with the base and a surface that bears the electronic device by supporting the support including a gradually increased gap therebetween as the cover is pivoted away from the base.

2. The hinge as claimed in claim 1, wherein the fixing frame is inserted through the joint.

3. The hinge as claimed in claim 1, wherein the fixing frame and the rotating frame include a stop mounted therebetween and non-rotatably positioned with respect to the fixing frame to limit a pivot angle that the rotating frame is adapted to rotate with respect to the fixing frame.

4. The hinge as claimed in claim 3, wherein the stop includes a circumferential edge defining two terminal ends separated from each other in a circumferential distance, which determines a range of the pivot angle of the rotating frame, to selectively abut against a projection extended from the rotating frame.

5. The hinge as claimed in claim 1, wherein the first connecting portion of the support includes a first joining member and a second joining member pivotally mounted on the first joining member for joining to the base of the electronic device.

6. The hinge as claimed in claim 5, wherein the first connecting portion of the support includes a pivot inserted through a slot defined in the second joining member and an aperture defined in the first joining member to pivotally connect the first joining member with the second joining member.

7. The hinge as claimed in claim 1, wherein the connecting member includes a middle section looped around the joint.

8. The hinge as claimed in claim 1, wherein the connecting member is a metal wire.

9. The hinge as claimed in claim 8, wherein the connecting member is of a flexible structure adapted to be circumferentially surrounded on the joint.

10. The hinge as claimed in claim 1, further comprising a resilient member including a first distal end for engaging with the base of the electronic device and a second distal end disposed on the support for facilitating the elevation of the electronic device.

11. The hinge as claimed in claim 1 further comprising a torque assembly interconnected between the rotating frame and the fixing frame to generate torque that is different for specific relative positions of the rotating frame with respect to the fixing frame.

12. The hinge as claimed in claim 11, wherein the torque assembly includes a first cam non-rotatably positioned with respect to the fixing frame, and a second cam engaging with the first cam and rotatable with the rotating frame relative to the fixing frame.

13. The hinge as claimed in claim 12, wherein the fixing frame is inserted through the first cam.

14. The hinge as claimed in claim 12, wherein the fixing frame is inserted through the second cam.

15. The hinge as claimed in claim 12, wherein the torque assembly includes an urging member resiliently retaining the first and second cams engaged together.

16. The hinge as claimed in claim 15, wherein the fixing frame is inserted through the urging member.

* * * * *